J. H. & E. W. BULLARD.
NUT LOCK.
APPLICATION FILED JUNE 20, 1910.
1,029,846.
Patented June 18, 1912.
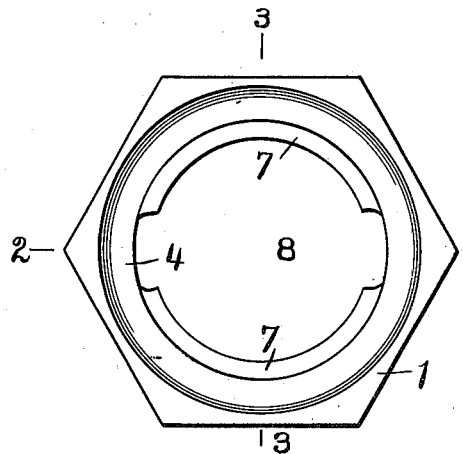
Fig. 1.
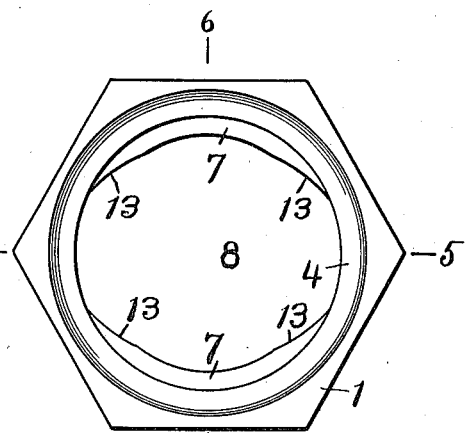
Fig. 4.
Fig. 2.
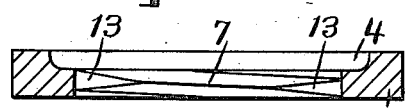
Fig. 5.
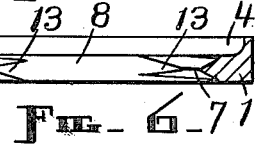
Fig. 6.
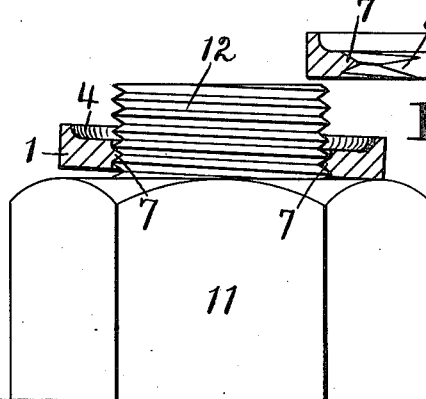
Fig. 3.
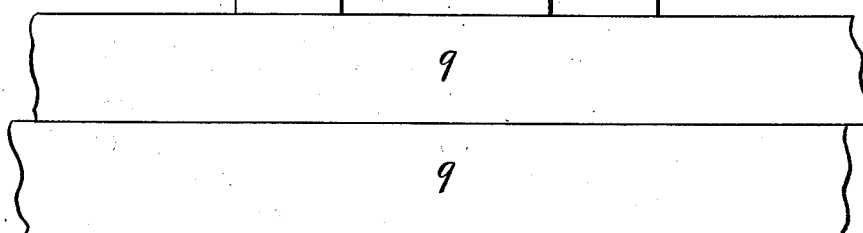
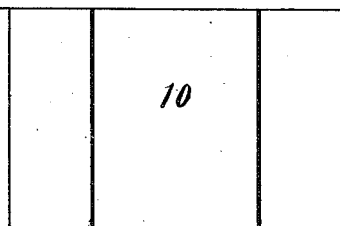
WITNESSES:
A. C. Fairbanks.
J. M. Davenport.
INVENTORS.
James H. Bullard
Edwin W. Bullard,
BY
Webster & Co.,
ATTORNEYS.

UNITED STATES PATENT OFFICE.

JAMES H. BULLARD AND EDWIN W. BULLARD, OF SPRINGFIELD, MASSACHUSETTS, ASSIGNORS TO ALFRED C. FAIRBANKS, OF SPRINGFIELD, MASSACHUSETTS.

NUT-LOCK.

1,029,846.  Specification of Letters Patent.  Patented June 18, 1912.

Application filed June 20, 1910. Serial No. 567,763.

*To all whom it may concern:*

Be it known that we, JAMES H. BULLARD and EDWIN W. BULLARD, both citizens of the United States of America, residing at Springfield, in the county of Hampden and State of Massachusetts, have jointly invented new and useful Improvements in Nut-Locks, of which the following is a specification.

Our invention relates to improvements in devices designed to hold internally screw-threaded members, such as nuts, and prevent them from turning in a reverse direction on the bolts upon which they are placed, and consists of an annular member having by preference one or more flat sides for the convenient application of a wrench, and provided on the interior of the opening with oppositely-disposed inwardly-projecting spiral or helical ridges or threads wedge shaped in cross-section and conforming more or less closely to the recess between the threads on the bolt with which the device is to be used, each of such first-mentioned threads being less than a single convolution and both being so arranged that corresponding or diametrically opposite points are the same distance from the flat or plane side of the device. A nut on a bolt which is subjected to incessant, excessive or violent jar or vibration frequently becomes loose, retrogrades, and even works off altogether, as is well known.

The object of our invention is to provide a device of the character described that is very simple in construction, can be manufactured at comparatively small cost, is strong and durable, can be easily and quickly applied, and is adequate to prevent a nut secured therewith to a bolt from getting loose. Neither the nut secured by this nut-lock nor the nut-lock itself, after the parts have been properly seated, will be sufficiently influenced by vibration to cause either to turn, owing to the peculiar construction of said nut-lock and the nature of its engagement with the nut held thereby and with the threads of the bolt. We attain this object by the means illustrated in the accompanying drawings, in which—

Figure 1 is a plan of a nut-lock which embodies a practical form of our invention; Fig. 2, a cross-section through said nut-lock taken on lines 2—2, in Fig. 1; Fig. 3, an elevation showing portions of two plates held together by a bolt and nut, the latter being secured by a nut-lock similar to that shown in the two preceding views, but somewhat smaller, (the nut-lock in this view is practically a cross-section taken on lines 3—3, in Fig. 1); Fig. 4, a plan of a slightly modified form of the nut lock; Fig. 5, a cross-section through such modification taken on lines 5—5, of Fig. 4 and Fig. 6, a cross-section taken on lines 6—6 of Fig. 4.

Similar figures refer to similar parts throughout the several views.

The nut-lock shown in the first three views consists of a polygonal body 1, having a countersink 4 in one face, and provided with oppositely-disposed inwardly projecting segmental ridges or threads 7—7 on the inside of the opening 8. These segmental ridges or threads are of suitable form to engage with the threads of the bolt, and they are spiral; that is, each forms a portion of a helix; but their arrangement is such that if they were continued to a length greater than one-half the circumference of the opening in the nut lock they would not join to form a single helix. By this arrangement the threads are so placed that corresponding opposite points are the same distance from the flat or plane side of the nut lock.

With the threads or ridges arranged as described, when the nut lock is applied to a bolt it assumes a position not at right-angles to the axis of the bolt, thus causing the lock, when screwed down on top of a nut, to touch or bear upon one side of the nut before touching the opposite side, as shown in Fig. 3. Further tightening of the nut lock now has a tendency to cause it to assume a position more nearly at right-angles to the axis of the bolt, thus setting up a considerable frictional pressure of the threads or ridges against the sides of the bolt threads. There is also an additional locking or gripping effect due to the fact that, when the lock is applied to a bolt, the gap or space between the ends of the ridges or threads on the nut-lock straddles the thread on the bolt; then when the nut-lock is screwed down to the proper tension against the nut, the tendency to assume a position at right angles to the axis of the bolt causes the ends of the ridges or threads in the nut lock to bear heavily against the alternate sides of the bolt thread, and so grip the bolt thread so tightly as to prevent the loosening of either the nut lock or the nut over which it is applied.

In the drawings we have shown the device with a recess or countersink on one side only, and we prefer this construction. But we do not limit ourselves to this one form for the reason that we have demonstrated by experiment that the nut lock may be made with the recess on both sides, or with no recess on either side, and that the nut lock is equally effective as a lock in any of these forms. By placing the recess all on one side, we are able to make the body of the nut lock sufficiently rigid to prevent distortion of the nut lock under the tension necessary to effectually lock the nut in place, while it is possible to apply the nut lock to a bolt that projects through the nut a much shorter distance than would be the case if there were a recess on the side of the nut lock next to the nut.

The device shown in Figs. 4, 5 and 6 differs from the others only in the shape of its threads 7, which are chamfered or tapered off at 13 to what amounts practically to vanishing points on the inside instead of having more or less abrupt ends as in the construction shown in Figs. 1 and 2. The second device is applied, and operates in the same way, as the first, but the threads or ridges of the second form do not engage so extensive an area of the bolt threads as do the threads or ridges of the first form.

Having therefore described our invention, what we claim and desire to secure by Letters Patent, is—

1. A nut lock consisting of a rigid plate having a bolt-receiving opening through it at right-angles to the plane of the face of the plate and having a plurality of spiral projections arranged in the bolt opening, all lying between two imaginary parallel planes at right-angles to the axis of the bore and each touching such planes at two points.

2. A nut lock consisting of a rigid plate having a bolt-receiving opening through it, the latter having inwardly projecting oppositely-arranged spirally-formed ridges each being of less length than one-half the circumference of the opening and each touching and located between two imaginary parallel planes at right-angles to the axis of the bore.

3. A nut lock consisting of a rigid plate having a bolt-receiving opening, the latter being provided with a plurality of internally projecting spiral thread-sections, corresponding points of each thread section lying in the same plane, parallel to the general plane of the device, substantially as shown.

4. A nut locking device comprising a rigid body, having a bolt-receiving opening through it, and having rigid spirally formed inwardly projecting thread engaging members separated from each other by a gap between their ends, said members being so disposed as to cause the face of the device adjacent the nut to occupy a position on the bolt other than at right angles to the bolt axis.

JAMES H. BULLARD.
EDWIN W. BULLARD.

Witnesses:
F. A. Cutter,
Allen Webster.